(12) United States Patent
Hernandez

(10) Patent No.: US 10,082,728 B2
(45) Date of Patent: *Sep. 25, 2018

(54) DEVICE AND METHOD FOR GAZE ATTRACTION TOWARD CAMERA

(71) Applicant: Jason Hernandez, San Diego, CA (US)

(72) Inventor: Jason Hernandez, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/369,719

(22) Filed: Dec. 5, 2016

(65) Prior Publication Data

US 2017/0082910 A1    Mar. 23, 2017

Related U.S. Application Data

(63) Continuation-in-part of application No. 14/719,040, filed on May 21, 2015, now Pat. No. 9,516,203.

(51) Int. Cl.
*H04N 5/225* (2006.01)
*G03B 17/56* (2006.01)
*H04M 1/02* (2006.01)

(52) U.S. Cl.
CPC ......... *G03B 17/566* (2013.01); *G03B 17/568* (2013.01); *H04M 1/0254* (2013.01); *H04N 5/2251* (2013.01); *G03B 2217/002* (2013.01); *H04M 2250/52* (2013.01)

(58) Field of Classification Search
CPC ............... G03B 17/566; G03B 17/568; G03B 2217/002; H04M 1/0254; H04M 2250/52; H04N 5/2251

See application file for complete search history.

(56) References Cited

U.S. PATENT DOCUMENTS

| 7,289,726 | B2 * | 10/2007 | Moriya | G03B 7/16 396/202 |
| 9,516,203 | B1 * | 12/2016 | Hernandez | H04M 1/0254 |
| 2015/0215483 | A1 * | 7/2015 | Farnsworth | F16M 13/02 348/207.1 |

* cited by examiner

*Primary Examiner* — Albert Cutler

(57) ABSTRACT

A device for holding a gaze-attracting object in a position adjacent to an electronic photographic device such as a digital camera or smart phone is provided. The device includes a body having one or a plurality first projecting members extending across a gap from a secondary projecting member. The device is positionable to an as-used position with a digital camera or smartphone engaged within the gap. Holding members projecting from the body opposite the gap, maintain an object therebetween and adjacent to the lens of the camera or smartphone or other digital photo device.

8 Claims, 11 Drawing Sheets

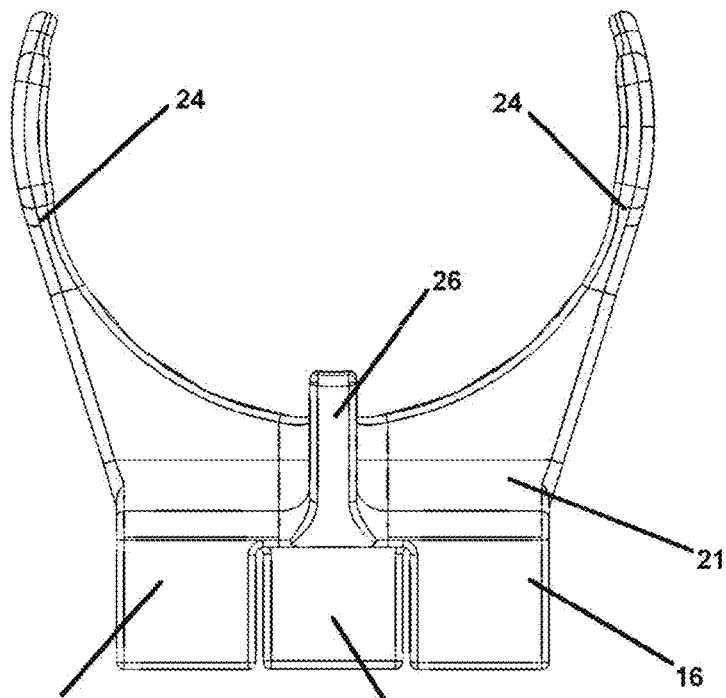
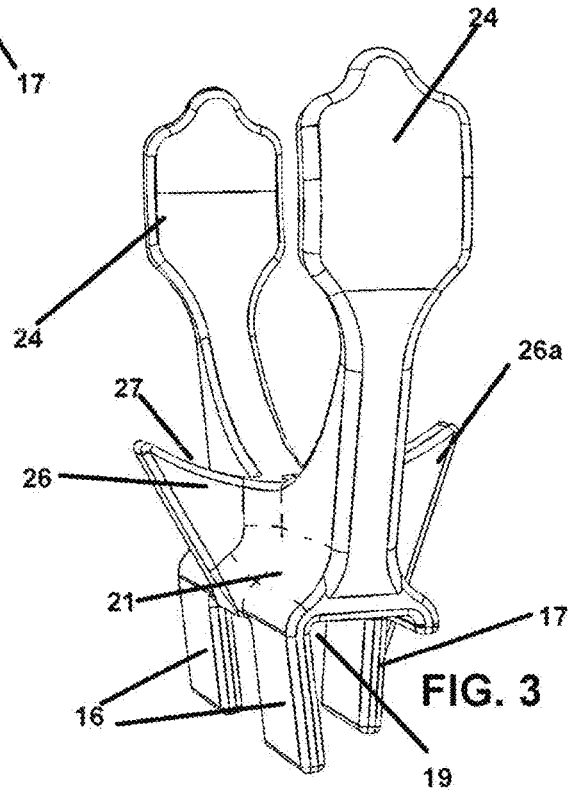

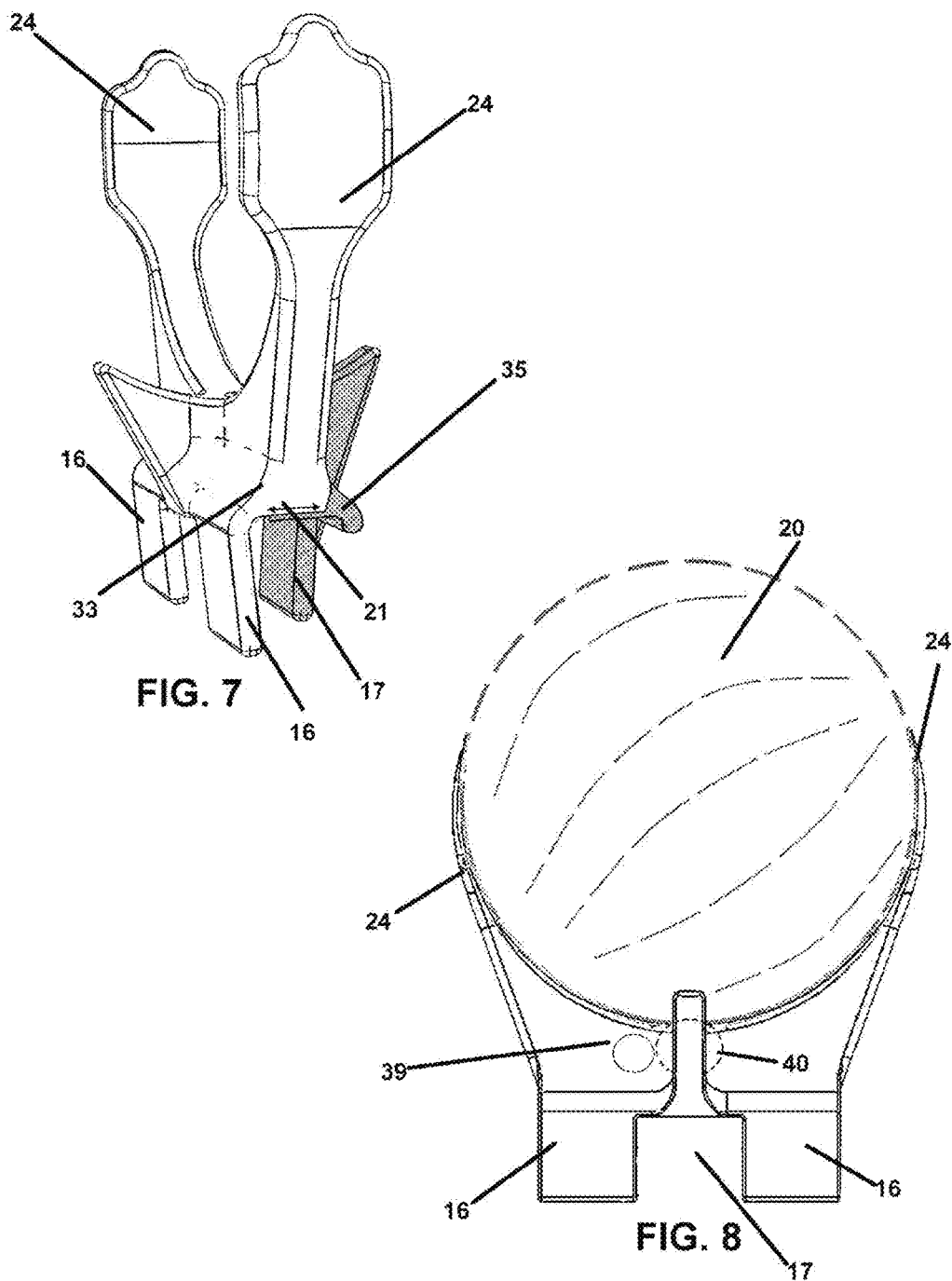

DEVICE AND METHOD FOR GAZE ATTRACTION TOWARD CAMERA

This application is a Continuation-in-Part application to U.S. patent application Ser. No. 14/719,040, filed on May 21, 2015, which is included herein in its entirety by this reference thereto.

BACKGROUND OF THE INVENTION

1. Field of the Invention

The present invention relates generally to a method and apparatus for gaining and maintaining the gaze of a subject of a photo for a camera. More particularly, the invention relates to a housing which is adapted on a first end to engage a plurality of photographic devices such as smartphones, electronic cameras, pads, and the like, to provide a platform to hold an object calculated to obtain the attention and maintain a continual gaze of the subject of a photograph, toward the camera.

2. Prior Art

Photography has been a popular endeavor for professionals and nonprofessionals for decades. However, whether it be a film camera or a digital camera device, a vexing problem continues for professional and amateur photographers alike when it comes to taking portraits and similar photos of inattentive subjects.

Young children have, for as long as cameras have been available, been a popular subject for photos. However, with infants and young children, their attention span and ability to ascertain the presence and location of the camera capturing their photo is extremely limited. A similar problem occurs with pets, such as dogs and cats. Such animals have no concept of a photograph or any need to maintain their gaze toward the camera lens prior to the activation of the shutter.

As a result, photographers taking photos of their pets are continually frustrated with the resulting photos when the pet has turned their head or looked away. The same frustration is felt by parents and photographers when trying to get that great photo of a small child when the resulting photograph lacks the proper gaze and facial direction of the child.

In the past, photographers have attempted to attract a pet or child's attention by waving, or holding food or a toy, or the like in one hand, while waiting for the subject of their photo to turn their head. Such has not worked well and frequently results in the photo being ruined by the movement of the photographer waving the object while trying to hold the camera in the other hand. Further, it is impossibly hard to position the object in line with the lens in most cameras and to hold the object inline with the front of the lens will ruin the shot. To position it behind the camera prevents the user from looking through the viewfinder or at the video display. As digital cameras have gotten smaller and been included in other devices such as smartphones and pad computers, the problem has ensued and gotten worse due to the small size of lenses and their sometimes odd placement on the electronic device.

Additionally, in dealing with pets, research has shown that scent, and a familiar favorite toy and slight movement thereof, and/or a scent thereon which is familiar, works better to attract and hold the attention and gaze of the pet toward the toy.

As a result, there is a continuing and unmet need for a system and method providing users the ability to position a gaze attracting object such as a toy or other object, adjacent and substantially inline with a camera lens, to thereby attract the subject to gaze toward the lens for a photo. Such a device should allow for the employment of objects familiar to the subject of the photo to increase their interest in looking at the object and toward the adjacent lens. Such a device should be configured for easy removable engagement to a plurality of different electronic devices and cameras to allow users to use it on all such devices.

Still further, when dealing with pet photography, such a device should enable the user to use a toy or object with which the pet plays to increase their attention and gaze toward the camera lens. Additionally, such a device might also include the ability to move the object upon the mount or housing to continuously attract the gaze of the subject of interest toward the camera lens and to allow the user to employ both hands for taking a photo.

The forgoing examples of related art and limitation related therewith are intended to be illustrative and not exclusive, and they do not imply any limitations on the invention described and claimed herein. Various limitations of the related art will become apparent to those skilled in the art upon a reading and understanding of the specification below and the accompanying drawings.

SUMMARY OF THE INVENTION

The device herein disclosed and described provides a solution to the shortcomings in current prior art and accomplishes the above noted goals through the provision of a camera engageable housing which is configured on a first end for engagement to one or a plurality of electronic and film cameras in a frictional engagement therewith in a gap defined between opposing projecting members. The device is, thus, well adapted to engage upon film cameras and is especially well configured for engagement upon an edge of an electronic photography device such as a digital camera, a smart phone, a pad computer, and other electronic devices having a camera lens and built in processor for capturing digital images therethrough.

Such devices frequently place the lens of the camera included therewith, along one edge of the electronic device but not necessarily centered. The device herein employing the frictional engagement within a gap between projecting members is especially well adapted for a slide-on engagement to a side edge of the electronic device to place it adjacent to the lens of the camera. In one mode the housing can be configured with a fixed gap adapted to frictionally engage a range of widths of electronic devices through a slight flex of the members. In another mode the projecting members on opposing sides of the gap can be adjusted for distance therebetween and allow the user to adjust the size of the gap to allow the side edge mounting to the electronic device of choice, adjacent the lens.

On the opposite end of the housing from the gap employed for edge mounting to an electronic camera or device having one, is positioned a holder for an object, which is the means to attract and maintain the gaze of the subject of the photograph. As depicted herein a favored mode for pets such as dogs, a mount to removably engage a spherical toy such as a ball is provided. Balls are a favored toy of a majority of dogs because of their association with play and easily attract and maintain the attention and continued gaze of the dog toward the ball. With the housing properly engaged to a side edge of the electronic component or camera adjacent the lens, the gaze of the dog toward the lens is assured.

Optionally, the housing can include means to move the object placed in the holder. In one favored mode, a small wheel is powered by a small electric motor to rotate the spherical ball slowly which has been shown in experimentation to increase the attention and the gaze of a dog toward the object which, when mounted adjacent the lens, increases the user ability to capture the face of the dog subject of the photo.

In addition to providing the housing with an adjustable gap, the device may also be provided with a housing having a connector at a central portion to allow engagement thereto of multiple holders to the housing. In this mode, the projecting members form either a fixed or adjustable gap on one end of the housing and any one of a plurality of object holders are engageable to the connector to position each holder at the opposite end of the formed housing. Such allows for use of holders for photos, toys, balls, or holders of virtually any shape and configuration on their holding side, with the proper mating connector to engage them with the connector on the portion of the housing from which the projecting members are engaged.

With respect to the above description, before explaining at least one preferred embodiment of the herein disclosed invention in more detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods, and systems for carrying out the engagement of an object to an electronic or other camera device and the several purposes of the present disclosed device. It is important, therefore, that the claims be regarded as including such equivalent construction and methodology insofar as they do not depart from the spirit and scope of the present invention.

The objects, features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF DRAWING FIGURES

The accompanying drawings, which are incorporated herein and form a part of the specification, illustrate some, but not the only or exclusive, examples of embodiments and/or features. It is intended that the embodiments and figures disclosed herein are to be considered illustrative rather than limiting. In the drawings:

FIG. 2 shows a view of the device of FIG. 1 in an unengaged position wherein the object or ball is disengaged.

FIG. 3 depicts a perspective view of the device as in FIG. 2 and shows the projecting members and a gap formed therebetween declining in size from the first end of the body to the distal ends of the projecting members.

FIG. 7 shows a mode of the device wherein front and rear portions are translatably adjustable for adjusting the size of the gap between the projecting members.

FIG. 8 shows a mode of the device having a means to move the held object such as a motor.

DETAILED DESCRIPTION OF THE PREFERRED EMBODIMENTS OF THE INVENTION

Figure 1:
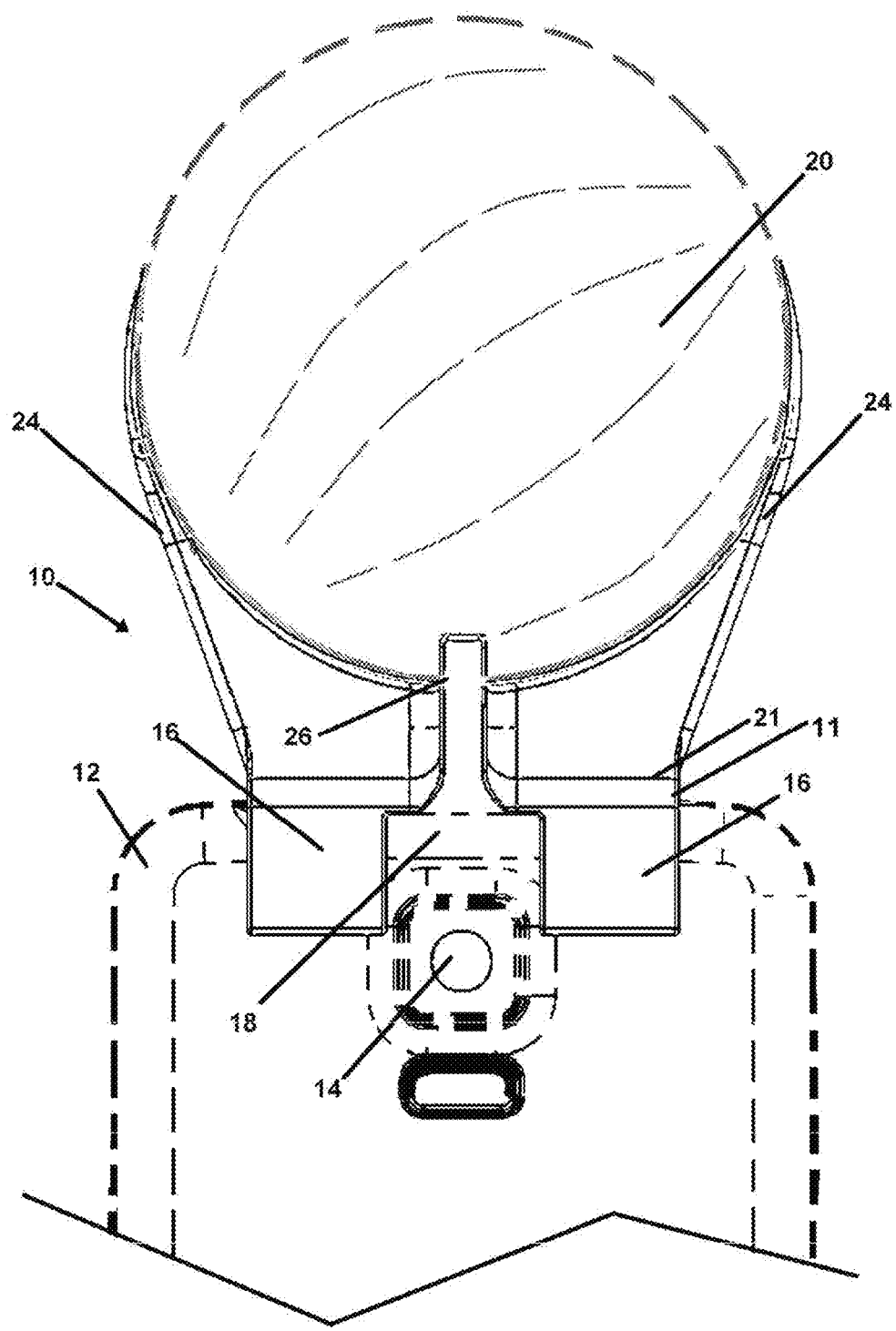
FIG. 1 depicts a mode of the device in an as-used position with a first end of a housing in an engagement with a side edge of a camera.

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Now referring to drawings in FIGS. 1-15, wherein similar components are identified by like reference numerals, there is seen in FIG. 1 a favored mode of the device 10 herein which is shown in an as-used position, with the body 21 engaged with a side edge of a camera 12 or electronic device having a camera therein having a lens 14, using a connector 11 formed integral to the body 21.

Also depicted, are the particularly preferred, at least one, but preferably a first pair of projecting members 16 or prongs. If a pair of first projecting members 16 are employed they project from a first side of the body 21 to distal ends and they define a slot 18 running in a plane therebetween projecting from a first side of the body 21 with the projecting members 16. The first projecting member or members 16 oppose a secondary projecting member 17 projecting away from the first side of the body 21 across a formed gap 19. The gap 19 is sized for engagement of the body 21 of the device 10 over the side edge of a camera device, such as a smartphone or digital camera, which is thereby frictionally engaged therebetween. As shown in FIG. 3, the gap 19 can be formed with a diameter which declines in size from a widest diameter adjacent the body 21 to a narrowest diameter in-between the respective distal ends of the first projecting members 16 and secondary projecting members 17. If the first and secondary projecting members are formed of flexible but elastic material, the distal ends will flex when a digital camera is placed therebetween to an as-used positioning of the device herein, and provide a compressive engagement.

The device 10 is especially well configured in the preferred mode to provide the user a connector to the camera 12 providing a target for positioning the lens 14 in an optimum position relative to the body 21 of the device 10, using the slot 18 as the position of choice, to provide the user a target to align a central portion of the held object 20, directly above and adjacent to the electronic device lens 14 to thereby center the gaze of a photographic subject on the object 20, with the lens 14.

This preferred configuration with the slot 18, helps the user position the device 10 in a manner where the person or pet looking at the object 20 will seem in the photo taken, to be looking at the lens 14 directly adjacent and below. This is particularly preferred since holding the object 20 in the hand, or attaching it to another spot on the camera 12 or similar electronic component, will cause the object 20 to be side-positioned wherein the infant or pet whose gaze is drawn to the off-center object relative to the lens 14, will be looking away from the lens 14 and the photo taken thereby. This positioning of the lens 14 within the slot 18 works well when a human and pet are both looking at the camera for a joint photo since the human will know where to look, and the pet will have their gaze drawn to the object 20 operatively engaged with the device 10.

Also shown in FIG. 1 is the holder for the object 20 which as depicted, is configured to engage a planar solid or compressible object, and especially well configured to engage a globular object 20 such as a ball, between two curved opposing projecting holding members 24 projecting to distal ends from a second side of the body 21, and defining the object holder. It is especially preferred to also include the depicted center supports 26 which project in a curve to distal ends positioned above the second side 23 of the body 21 in a direction normal to an imaginary line running between the opposing projecting holding members 24.

The center supports 26 preferably include inclining top surfaces 27, preferably to form a curved ramp, which provide central support to prevent dismounting should the object be round or globular as the depicted ball. It was found during experimentation that the device 10 would function with globular or other objects engaged between the projecting members only, but that the device 10 performed in a superior fashion in the as-used position, engaged with a camera device, should the engaged camera, or the device 10, be moved suddenly or tilted along a plane running perpendicular to the edge of the camera 12 on which it is engaged. This is because sudden jolts or movements tended to dismount the held object 20 if the center support 26 was not present, or in some cases not curved. Consequently, because the device may be employed with a globular object 20 or other odd-shaped objects, inclusion of the depicted center supports 26 are preferred.

FIG. 2 depicts a rear view of the device 10 of FIG. 1, in a disengaged position. Also, the object 20 is dismounted to show the spaced formed between the pair of opposing holding members 24 and the curved inward surfaces of the two opposing holding members 24 which adapts the device 10 to removably engaged globular and circular shaped objects 20 as well as planar sided objects.

Additionally shown in FIG. 2, is the connector for the body 21 of the device 10 to a camera 12 or the like. In a preferred mode the connector features an opposing prong or secondary projecting member 17 having a formed gap 19 for engagement of the camera 12 edge between it and the first pair of opposing projecting members 16 which define the slot 18, which is an opposing position to the rear prong or secondary projecting member 17. The first one or pair of projecting members 16 and the rear or secondary projecting member 17 all project from respective first ends engaged with a first side of the body 21 of the device 10, to distal ends and define a connector for the body 21 to the camera 12 which is maintained frictionally or compressibly engaged in the gap 19.

FIG. 3 depicts a perspective view of the device 10 in FIG. 2 and shows the connector formed by the first projecting member or members 16 and secondary member 17 and gap 19 formed therebetween. As depicted in this and other figures, the gap 19 can be and preferably is declining with a narrowest portion between the distal ends of the projecting members 16 and secondary projecting member, to a wider portion adjacent the first side of the body 21.

In modes of the device 10 with the connector employing this narrowing gap 19 and where the projecting member or members 16 and secondary projecting member 17 are formed of pliable material, such as plastic or polymeric material or flexible metal or the like, a biased or compressive engagement to the edge of the electronic device or camera 12 can be achieved where the opposing first member or pair of members 16 compress the camera 12 against the rear or secondary projecting member 17. Additionally, this narrowing gap 19, provides the connector the ability to adjust to differing camera thicknesses and engage them with a secure engagement with the edge of the camera abutting the body 21 within the gap, and with the members 16 and secondary member 17 flexing to accommodate the thickness of the camera positioned in the gap 19 in the biased engagement.

Figure 4:
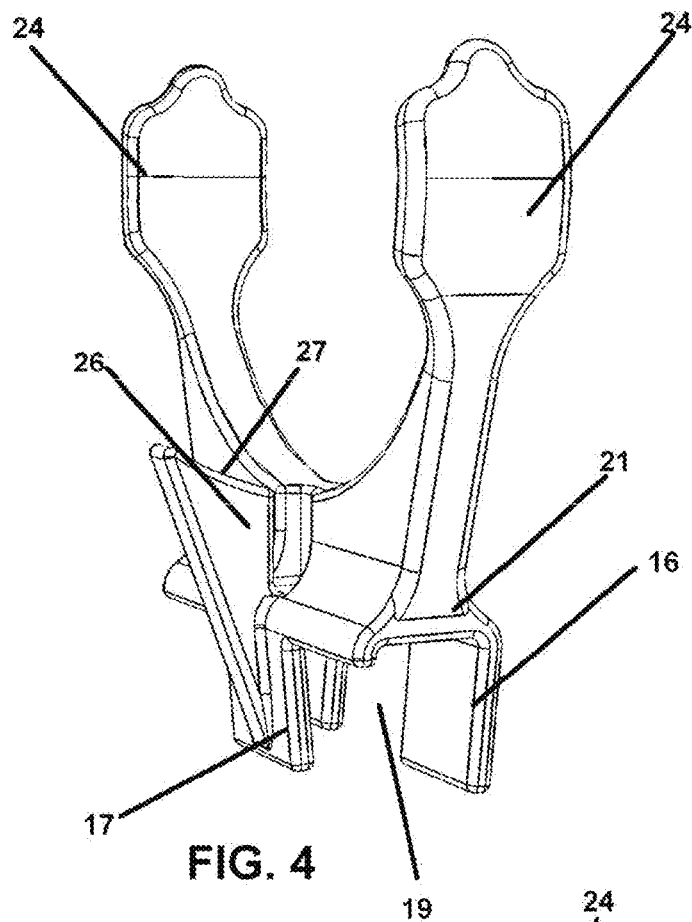
FIG. 4 is a reverse view of the device from that of FIG. 3.
Figure 5:
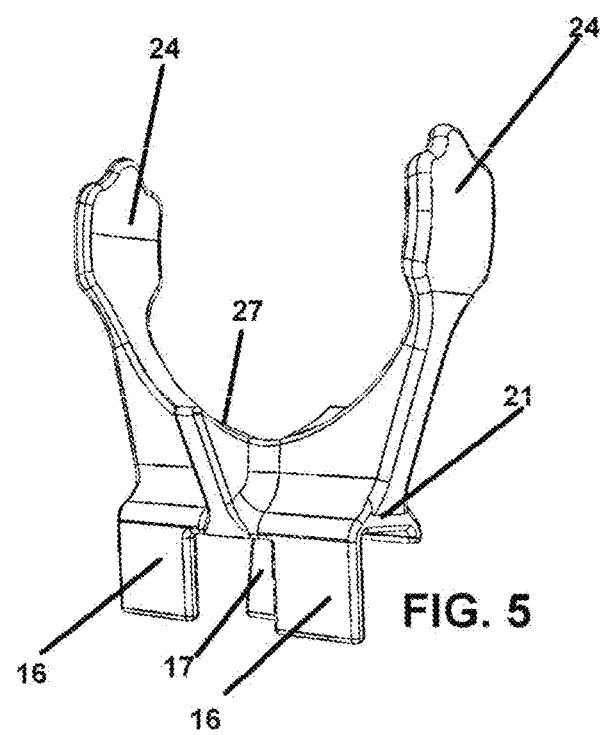
FIG. 5 depicts the device of FIG. 4 from a different perspective view.

FIG. 4 is a reverse view of the device from that of FIG. 3 showing a central positioning of the rear or secondary projecting member 17 opposite the slot and in between the first pair of projecting members 16. FIG. 5 depicts the device 10 of FIG. 4 from a different perspective view of the front of the device 10 and showing the first projecting member or members 16 extending away from the first side of the body 21 of the device 10. As noted, the first projecting member 16 could be a single member if the slot 18 were not required or desired by the user.

Figure 6:
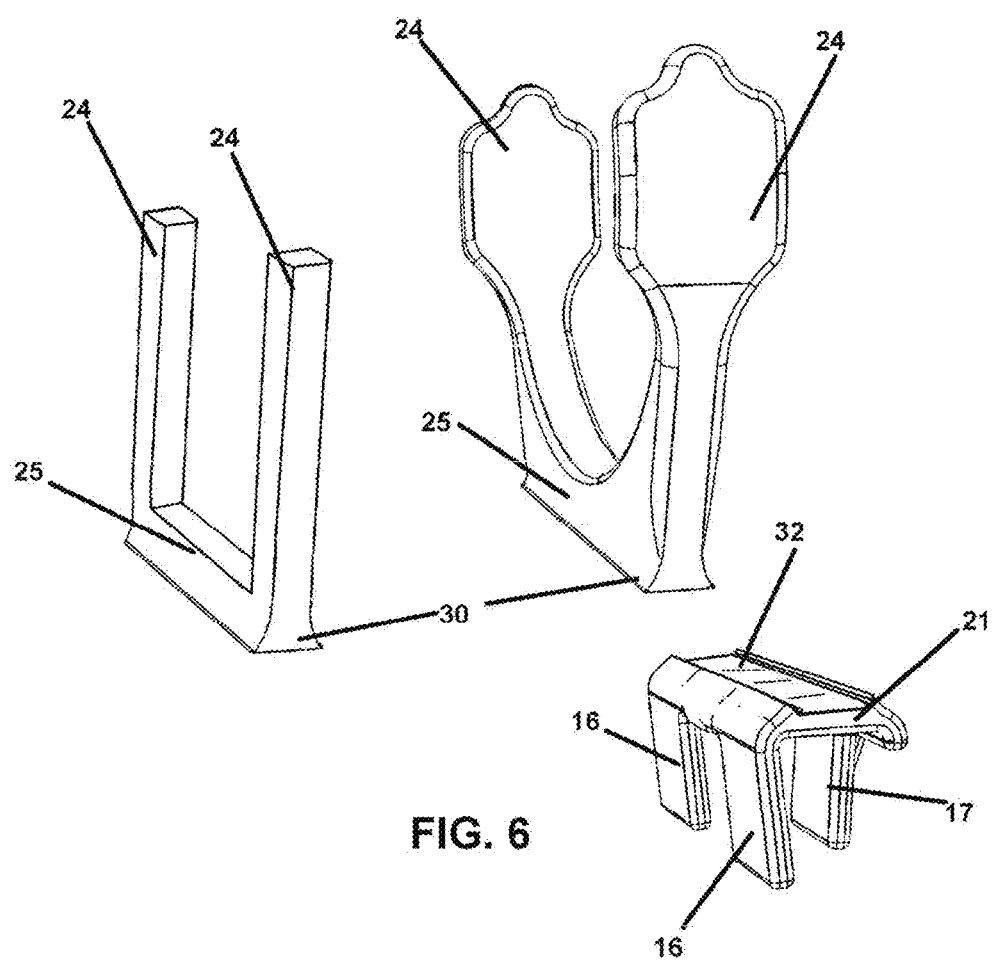
FIG. 6 shows a mode of the device having disengageable holders for attachments to a body having the projecting members forming the engagement gap.

FIG. 6 shows a mode of the device 10 having disengaged or disengageable object holders 25 which may be adapted in configuration and shape to best engage the object 20 intended. The holders 25 might also be formed in a unitary structure with the body 21 and could be the shown linear posts forming the holding members 24 or the holding members 24 having opposing curved surfaces adapted to hold a globular object 20.

Figure 15:
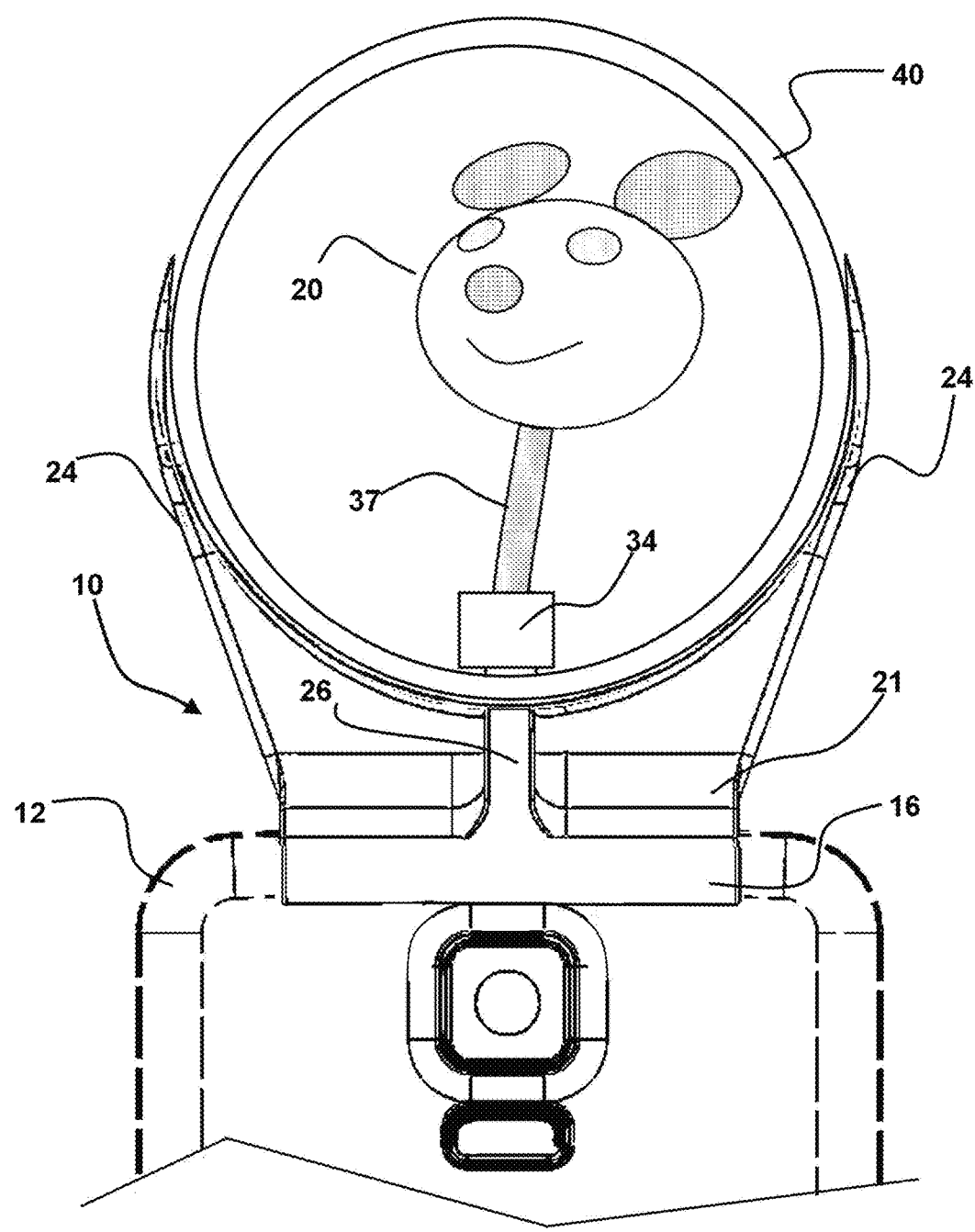
FIG. 15 shows a mode of the device herein having a moveably mounted gaze attraction component such as in FIG. 10 or 11, which is engaged to an annular ring adapted for removable engagement between the two projecting holding members similar to the engagement of a ball therebetween such as in FIG. 1, or 8-9.

In all modes, the holders 25 have respective first ends 30 which are either connected to body 21 as in FIG. 1 or 15, or have a connector thereon adapted to removably engage a mating connector on the body 21. As depicted, one mode of such engageable mating connectors is shaping the first ends 30 for a cooperative removable engagement with a complementary surface 32 on the second side of the body 21. However, if the holders 25 are rendered removable from the body 21, any removable mating engagement between the body 21 and the holders 25 as would occur to those skilled in the art will work.

FIG. 7 shows a mode of the device 10 wherein front 33 and rear 35 portions of the body 21 engaging the holder 25 and first projecting member or members 16 and secondary projecting member 17, are translatably adjustable with each other. In use, the user may adjust the rear 35 of the body closer to or further from the front portion 33 of the body 21 and thereby adjust the size of the gap 19 between the first pair of projecting members 16 and the rear or secondary projecting member 17. Adjusting the gap 19 allows the device 10 to engage cameras 12 and electronic components of differing thickness, and provides a means to adjust the biased compressed engagement of the device 10 thereon.

FIG. 8 depicts a mode of the device 10 having a means to move the held object 20 such as a motor 39 in operative engagement with a wheel 40 positionable to make a contact with a surface of the object 20. In this mode the object 20 would be loosely held by the holder 25 between the curved opposing surfaces of projecting members 24 and would move within the engagement therewith.

Figure 9:
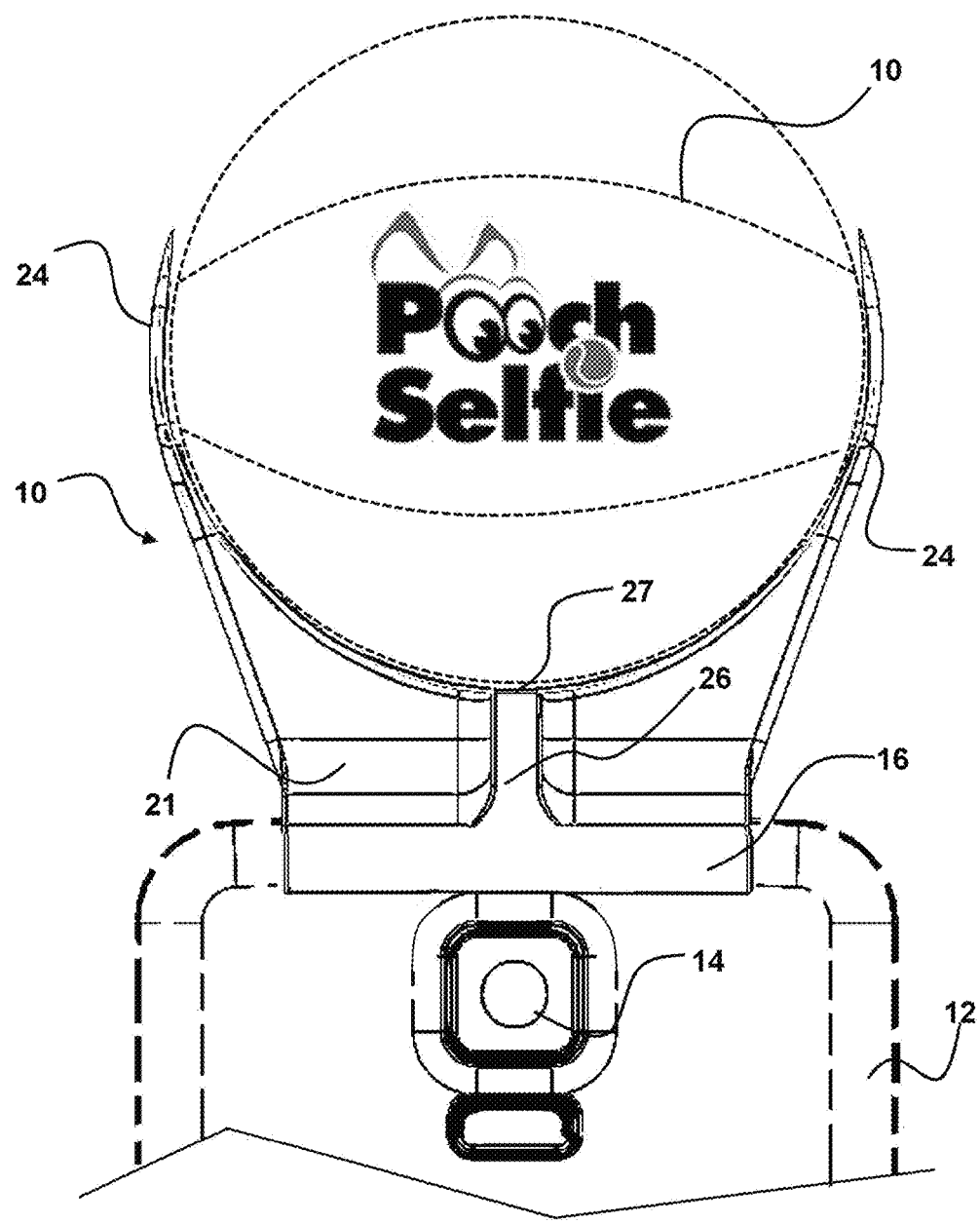
FIG. 9 depicts a mode of the device adapted to hold a ball in contact between the two curved holding members, such as in FIG. 1 but having a lower center support on both sides and a single projecting member adapted for contact with one side of an electronic device.

FIG. 9 depicts a mode of the device 10 adapted to hold a globular object 20 such as a ball or the like such as in FIG. 1 but having a lowered top surface 27 of the center support 26 substantially even with the second side of the body 21 on both sides of the body 21. As noted, the inclining top surface 27 such as in FIG. 1 is preferred for a more secure engagement of the object 20, but this mode shown in FIG. 9 does provide a solid connection to the object 20, especially where the projecting holding members 24 have opposing curved surfaces for contact with the curved object 20. As shown, the interior surfaces of both holding members 24 are curved as is the exterior surface of the gaze attracting object 20 which is contacted on opposing sides by the holding members 24 curved interior surfaces. Both holding members 24 may be formed of elastic material such as plastic or polymeric material, and be pushed away from each other by the contact with opposing sides of the curved object 20. This results in a biased engagement of the object 20 between the two holding members 24 which will resist being pushed in opposing directions by the contacts with the object 20, such as a curved ball. The diameter of the curved object 20 from side to side would be slightly larger than the space between the opposing interior surfaces of the two holding members 24, in this mode.

Also shown is configuration of the body 21 having a single first projecting member 16 adapted for contact with one side of an electronic device, which as noted above is a configuration for the device 10 where the slot 18 is not required or desired. Where a non globular object 20 is engaged between the opposing holding members 24 they might be configured in a linear fashion such as shown in FIG. 6.

Figure 10:
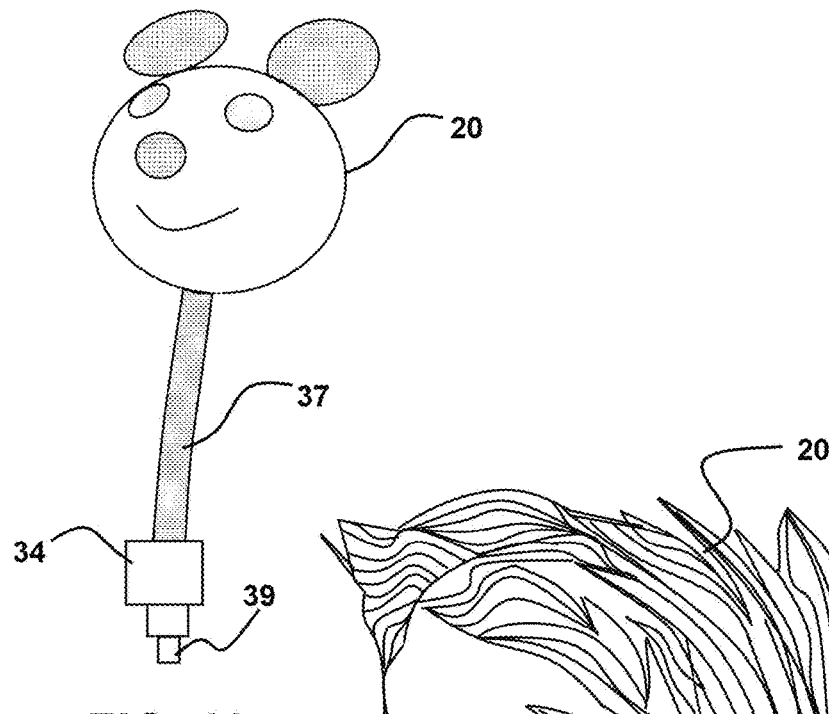
FIG. 10 depicts an gaze attracting component adapted for movement while engaged which will attract the gaze of a cat.
Figure 12:
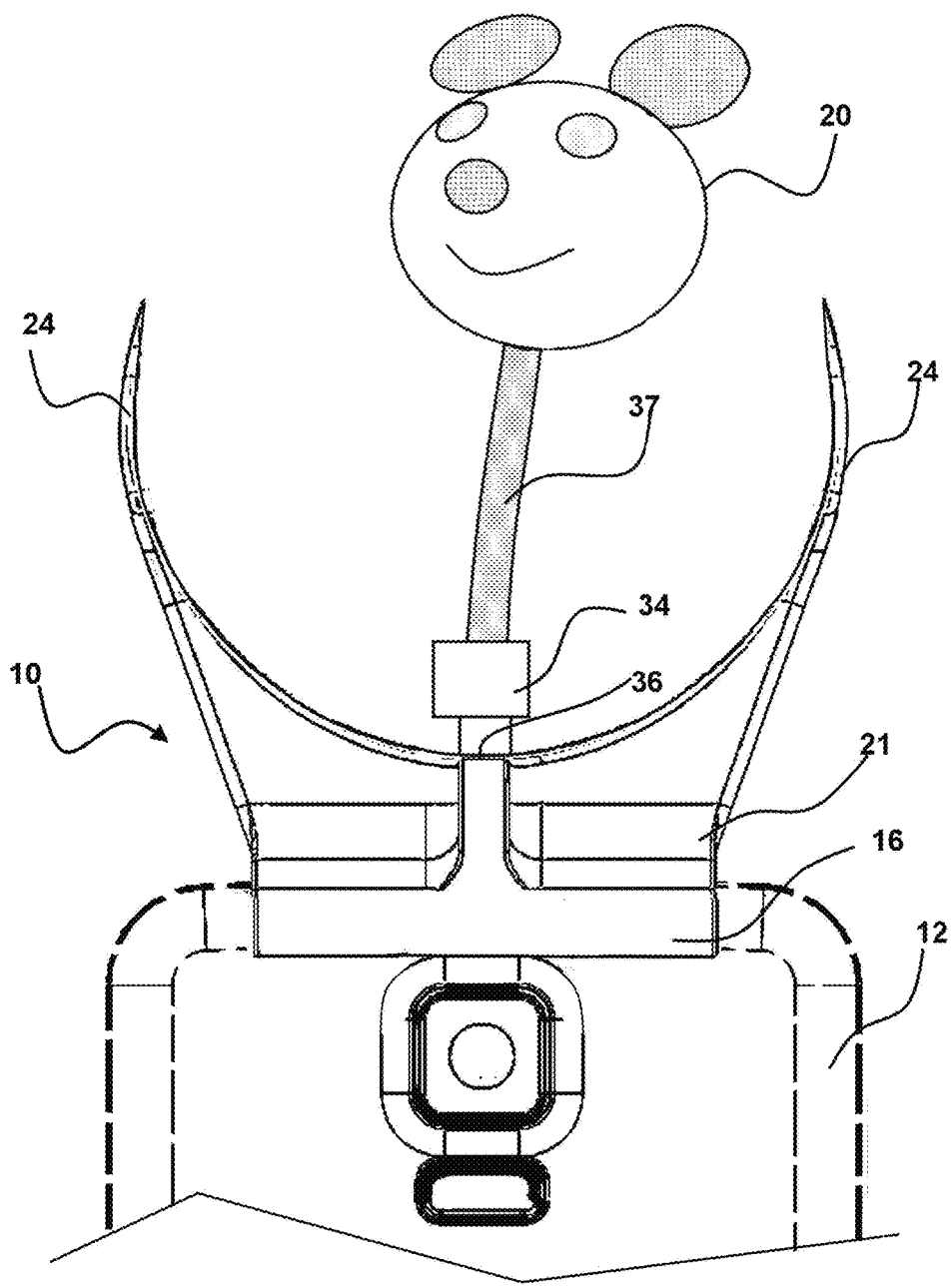
FIG. 12 shows the moveably mounted gaze attracting component of FIG. 10 as it might be removably engaged with the device of FIG. 1 or 8 by a removable connection thereto.
Figure 13:
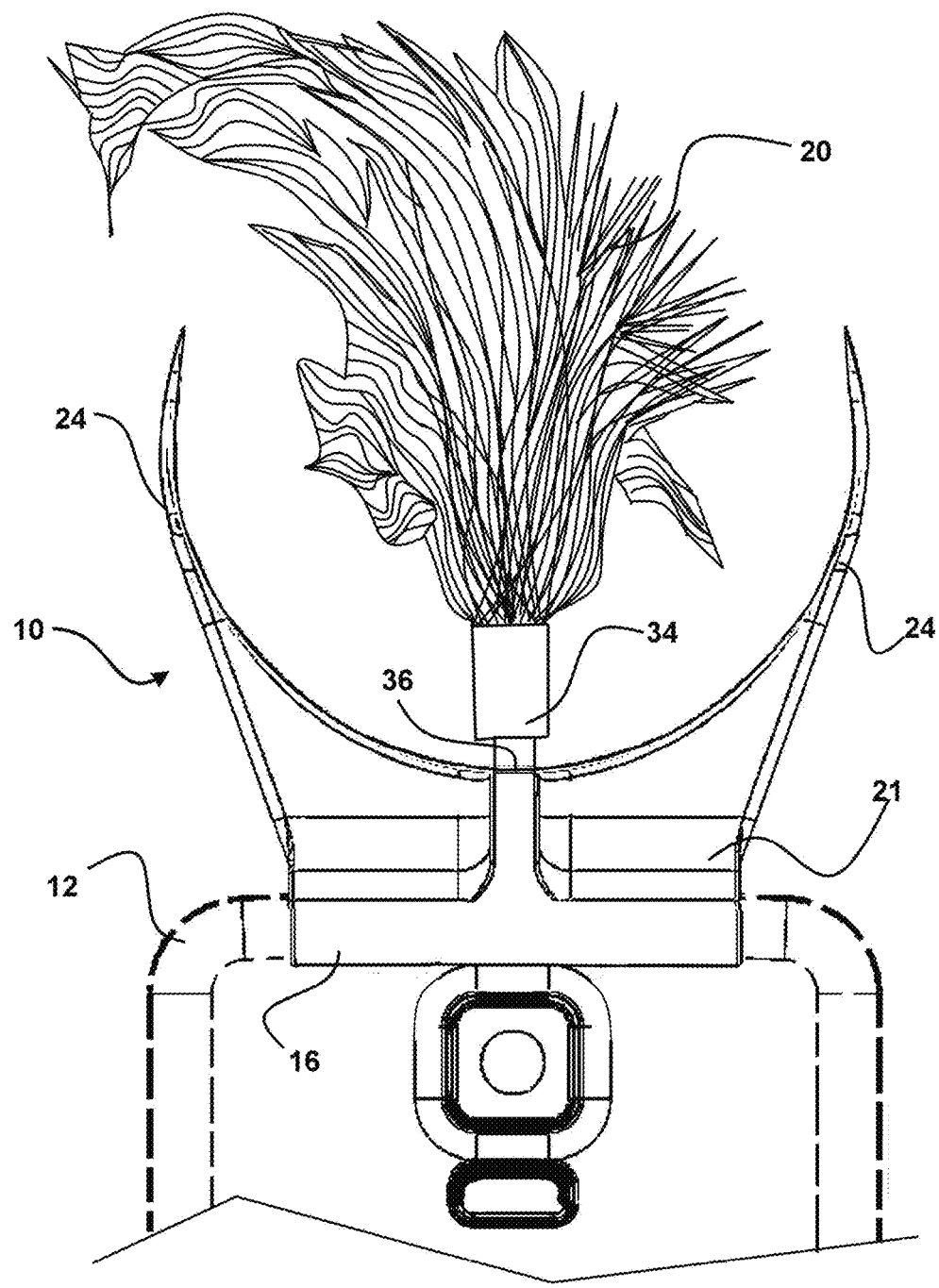
FIG. 13 shows the moveably mounted gaze attracting component of FIG. 11 as it might be removably engaged with the device of FIG. 1 or 8 by a removable connection thereto.

FIG. 10 depicts a gaze attracting object 20 which is adapted for movement while connected with the body 21 of the device 10. As shown, a flexible member 37 extends between a mount 34 at a first end thereof, to the object 20 engaged with the second end of the flexible member 37. The mount 34 is configured to removably connect to a complementary connector 36 positioned on the body 21 of the device 10, such as in FIGS. 12 and 13. As shown in FIGS. 12 and 13, this complementary connector 36 is passage extending into the first side of the body 21 of the device 10 size for frictional engagement with the exterior surface and shape of a projecting tip 39 of the mount 34.

Figure 11:
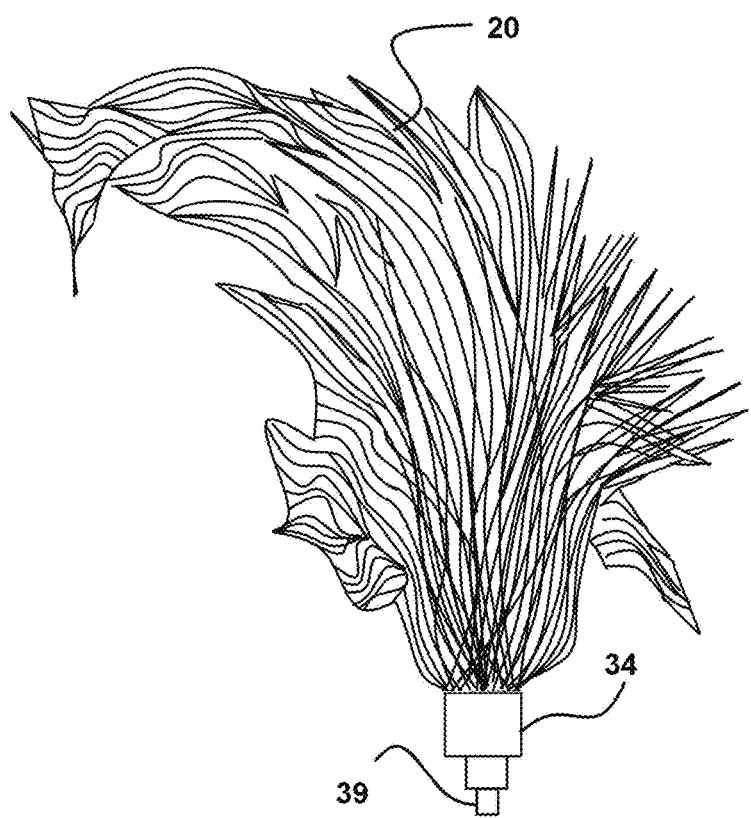
FIG. 11 shows another gaze attracting component adapted for movement while engaged to thereby maintain the gaze of a cat.

FIG. 11 shows another gaze attracting object 20 in the form of a feather or the like, which like the object 20 of FIG. 10, is adapted to move while engaged to the body 21 of the device 10 during use. Movement of the feathers forming the object 20 of FIG. 11, much like the movement of the object 20 when the flexible member 37 moves, will maintain the attention and gaze of a predator type animal such as a cat, and will also maintain the gaze of a dog. As shown in FIG. 11, a mount 34 is connected to the object 20 formed by feathers, and the mount 34 has a first connector adapted to removably engage with a second connector on the body 21. In this case the first connector is the tip 39 shown which is sized for a frictional engagement within a passage depending into the body 21 of the device 10 such is in FIGS. 12-14. This engagement between mating connectors on both the mount 34 and the body 21 may be other mating connectors such as hook and loop fabric, magnets, threads, slots, or similar mating connectors on both components.

FIG. 12 shows the moveably mounted gaze attracting object 20 of FIG. 10 where it is removably engaged with a body 21 of the device 10 such as the body 21 of FIG. 1 or 8 by a removable connection thereto. As shown, the removable engagement between the mount 34 and the body 21 is with the tip 39 of FIGS. 10-11, engaged within the mating connector which is the noted passage depending into the body 21. In the mode of the device of FIGS. 12 and 13, the two holding members 24 can also extend from the body 21 thereby allowing the engagement of an object 20 therebetween also, should the user wish to change the type of object 20.

As shown in FIG. 12, the object 20 will move when the flexible member 37 such as a spring, flexes when the user moves the camera or other component to which the device 10 is engaged. Also as shown, the first member 16 is a single component which as noted is a configuration employable in all modes of the device shown and described herein where the slot 18 is not needed.

FIG. 13 shows the moveable gaze attracting object 20 of FIG. 11 as it might be removably engaged with the body 21 of the device 10 of FIG. 1 or 8 using the noted removable connection thereto. In the removable connection mating complementary connectors on both the mount 34 and the body 21 allow for a removable engagement of the object 20 to the body 21. As shown, the tip 39 is complementary in shape and size to frictionally engage the complementary mating connector 36 in the form of a passage depending into the second side of the body 21.

Figure 14:
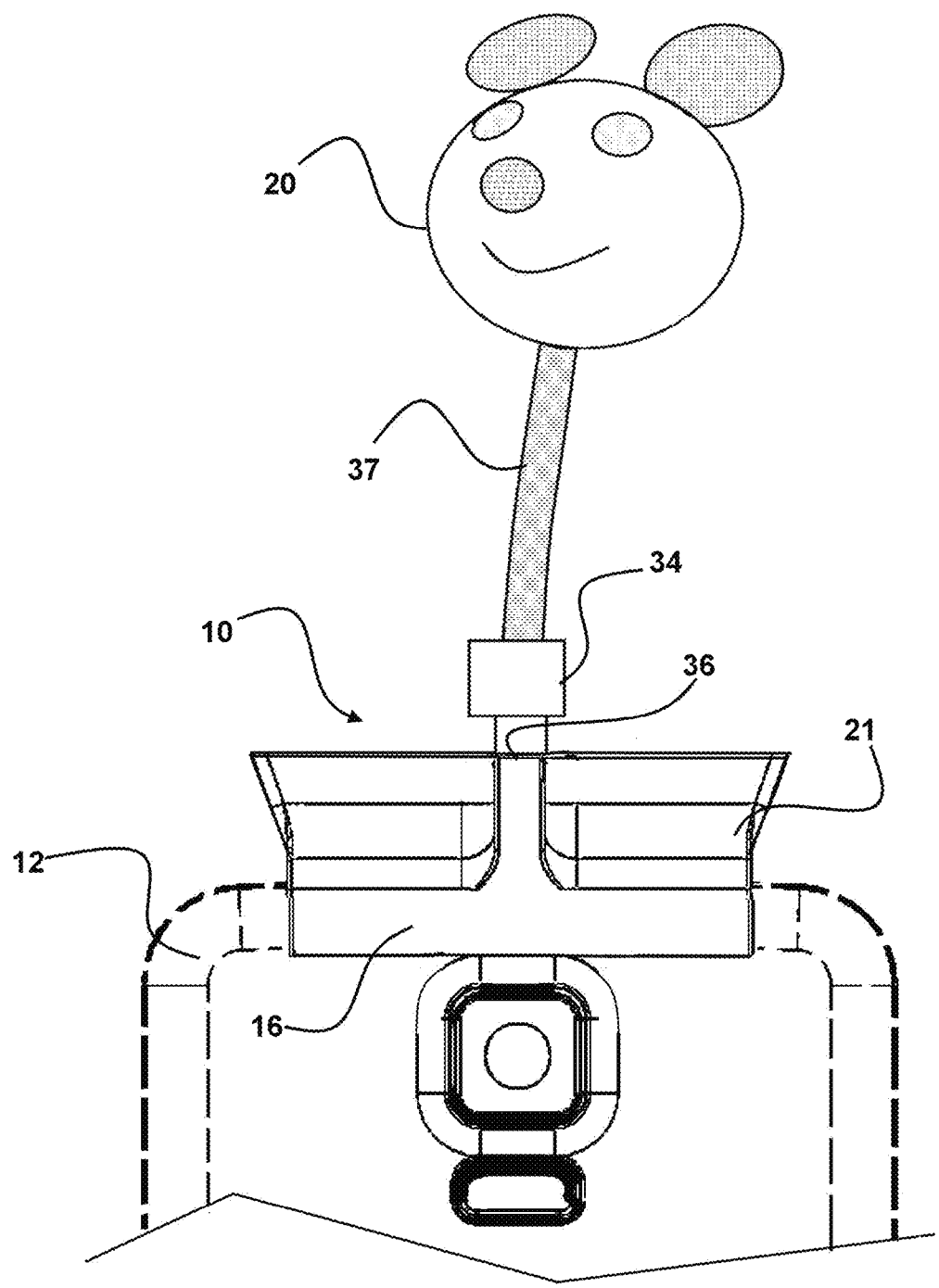
FIG. 14 depicts a gaze attracting component similar to that of FIG. 10 in a removable or other engagement to the mount component of FIG. 6.

FIG. 14 depicts a gaze attracting object 20 similar to that of FIG. 10 in an engagement to the body 21 which is shaped similar to the body shown in FIG. 6 without the holding members 24 projecting therefrom. As shown, the moveable gaze attracting object 20 can be engaged and removed, and if the device 10 is modular as in FIG. 6, the projecting holding members 24 can also be engaged as needed.

Finally, FIG. 15 shows a mode of the device 10 herein having a moveable gaze attraction object 20 such as in FIG. 10 or 11, which is engaged to an annular ring 40. The ring 40 is sized for a removable engagement between the two projecting holding members 24 similar to the engagement of a globular object such as a ball therebetween such as in FIG. 1, or 8-9. This configuration of the device 10, allows the user to engage the object 20 independently with the holding members 24 such as with a ball, or engage any moveable or other gaze attracting object 20 which is connected to and positioned within the area surrounded by the annular ring 20 which engages between the holding members 24.

It should be noted while described herein and shown in the drawings, this invention has other applications, potentially, and one skilled in the art could discover these. The explication of the features herein and in the drawings of this invention does not limit the claims of this application.

It is additionally noted and anticipated that although the device is shown in its most simple form, various components and aspects of the system disclosed may be differently configured or slightly modified when forming the invention herein. As such, those skilled in the art will appreciate the descriptions and depictions set forth in this disclosure or merely meant to portray examples of preferred modes within the overall scope and intent of the invention, and are not to be considered limiting in any manner.

While all of the fundamental characteristics and features of the gaze attracting invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed:

1. An apparatus for holding a gaze-attracting object, in a position adjacent to an electronic photographic device, comprising:
    a body having a first side opposite a second side;
    a first projecting member extending from a first end connected to said first side of said body, to a distal end;
    at least one secondary projecting member projecting from a first end connected to said body, to a distal end thereof;
    a gap formed between said first projecting member and said secondary projecting member, said gap having a gap diameter sized to engage said electronic photographic device therein, to thereby position said body to an as-used position;
    a pair of holding members projecting from respective first ends connected with said second side of said body, to respective distal ends of said holding members;
    said holding members each having a respective interior surface defining a diameter of a space therebetween;
    said space adapted for positioning said gaze-attracting object therein, held in-between and in contact with both respective said interior surfaces of said holding members;
    a pair of center supports extending from first ends engaged with said body to respective distal ends;
    said pair of center supports extending from opposing positions at a central portion of said second side of said body;
    said distal ends of said center supports projecting above a first side surface on said second side of said body; and
    said distal ends of said center supports providing contacts for preventing movement of said object held in said space between said holding members, in a direction normal to a line running between said holding members; and
    whereby with said body, while in said as-used position, locates said gaze attracting object held in-between said holding members, adjacent to a lens of said electronic photographic device.

2. The apparatus for holding a gaze-attracting object of claim 1, wherein each respective interior surface of each of said holding members is curved; and
    said gaze attracting object has a curved exterior surface.

3. The apparatus for holding a gaze-attracting object of claim 2 additionally comprising:
    said gaze-attracting object having an object diameter running between opposing sides of said exterior surface;
    said object diameter being larger than said diameter of said space; and
    a biased engagement of said gaze-attracting object being formed in said space, said biased engagement formed by a respective biased contact of each of said interior surfaces with said exterior surface upon opposite sides of said gaze-attracting object.

4. The apparatus for holding a gaze-attracting object of claim 1, additionally comprising:
    said gaze attracting object being moveable upon a connection with a mount; and
    complementary connectors positioned on both said mount and said body, said complementary connectors removably engageable to connect said mount to said body.

5. An apparatus for holding a gaze-attracting object, in a position adjacent to an electronic photographic device, comprising:
    a body having a first side opposite a second side;
    a first projecting member extending from a first end connected to said first side of said body, to a distal end;
    at least one secondary projecting member projecting from a first end connected to said body, to a distal end thereof;
    a gap formed between said first projecting member and said secondary projecting member, said gap having a gap diameter sized to engage said electronic photographic device therein, to thereby position said body to an as-used position;
    a pair of holding members projecting from respective first ends connected with said second side of said body, to respective distal ends of said holding members;
    said holding members each having a respective interior surface defining a diameter of a space therebetween;
    said space adapted for positioning said gaze-attracting object therein, held in-between and in contact with both respective said interior surfaces of said holding members;
    said gaze attracting object being moveable upon a connection with a mount;
    said mount engaged with an interior of an annular ring;
    each respective said interior surface of each of said holding members being curved;
    said annular ring positionable within said space with respective opposing sides of said annular ring engaged with respective said interior surfaces of said holding members; and
    whereby with said body, while in said as-used position, locates said gaze attracting object held in-between said holding members, adjacent to a lens of said electronic photographic device.

6. The apparatus for holding a gaze-attracting object of claim 5, additionally comprising:
    said annular ring having a ring diameter running between said opposing sides of said annular ring;

said ring diameter being larger than said diameter of said space;

said pair of holding members formed of flexible material; and a biased engagement of said annular ring being formed in said space, said biased engagement formed by a respective biased contact of each of said interior surfaces of said holding members with respective said opposing sides of said annular ring.

7. The apparatus for holding a gaze-attracting object of claim 6, additionally comprising:

a pair of center supports extending from first ends engaged with said body to respective distal ends;

said pair of center supports extending from opposing positions at a central portion of said second side of said body;

said distal ends of said center supports projecting above a first side surface on said second side of said body; and said distal ends of said center supports providing contacts for preventing movement of said object held in said space between said holding members, in a direction normal to a line running between said holding members.

8. The apparatus for holding a gaze-attracting object of claim 5, additionally comprising:

a pair of center supports extending from first ends engaged with said body to respective distal ends;

said pair of center supports extending from opposing positions at a central portion of said second side of said body;

said distal ends of said center supports projecting above a first side surface on said second side of said body; and said distal ends of said center supports providing contacts for preventing movement of said object held in said space between said holding members, in a direction normal to a line running between said holding members.

* * * * *